United States Patent [19]
Stone

[11] 3,958,100
[45] May 18, 1976

[54] MEANS FOR PREVENTING HEAT BUILD-UP IN A WALL-MOUNTED ROOM VENTILATOR

[75] Inventor: Thomas W. Stone, Owosso, Mich.

[73] Assignee: Ventrola Manufacturing Company, Owosso, Mich.

[22] Filed: Jan. 11, 1974

[21] Appl. No.: 432,498

[52] U.S. Cl. .............................. 219/361; 98/40 DL; 219/220; 219/343; 219/364; 219/380; 240/2 V; 240/47

[51] Int. Cl.² ........................ H05B 1/02; F24F 7/02; F21V 29/00

[58] Field of Search ............................ 219/359–364, 219/366–372, 374–376, 379, 380, 220, 342, 343, 358, 472–475; 240/2 V, 9 A, 47; 98/40 DL

[56] References Cited
UNITED STATES PATENTS

| | | | |
|---|---|---|---|
| 1,528,300 | 3/1925 | Noonan | 219/370 X |
| 1,976,651 | 10/1934 | Brantingham | 219/374 X |
| 2,246,069 | 6/1941 | Schechtel et al | 219/370 UX |
| 2,471,784 | 5/1949 | Seifner et al | 219/370 UX |
| 2,492,774 | 12/1949 | Wild | 219/364 |
| 2,503,862 | 4/1950 | Allgeyer | 219/364 |
| 2,600,044 | 6/1952 | Ayres et al | 219/369 |
| 2,647,198 | 7/1953 | Lautner | 219/374 X |
| 2,694,136 | 11/1954 | Smith | 219/370 |
| 2,697,164 | 12/1954 | Knapp et al | 219/370 X |
| 3,309,502 | 3/1967 | Witherspoon | 219/369 |
| 3,786,233 | 1/1974 | Bumpus et al | 219/220 X |

*Primary Examiner*—A. Bartis
*Attorney, Agent, or Firm*—Harness, Dickey & Pierce

[57] ABSTRACT

A wall mounted room ventilator apparatus includes a blower driven by a two speed electric motor, electric lighting means and electric heating means. A selector switch is provided for selecting operation of at least (1) only the lighting means, (2) only the heating means (3) the blower at its high speed alone or in combination with the heating means and lighting means to provide a ventilation function. In order to prevent heat build-up in the apparatus when only the lighting means is energized, a normally open thermostatic switch is positioned in the housing of the apparatus and arranged in circuit between the selector switch and the blower motor for driving the blower at its low speed when the thermostatic switch is closed by the temperature within the apparatus exceeding a predetermined temperature. In one arrangement the thermostatic switch is also arranged in circuit with the selector switch and blower motor to drive the blower at its low speed when heat only is selected and the temperature in the apparatus exceeds the predetermined temperature. In an alternative arrangement the blower is driven at its low speed independently of the thermostatic switch when heat only is selected.

5 Claims, 3 Drawing Figures

MEANS FOR PREVENTING HEAT BUILD-UP IN A WALL-MOUNTED ROOM VENTILATOR

CROSS REFERENCE TO RELATED APPLICATION

Reference may be had to the co-pending application of Thomas W. Stone and Stanley D. Benton filed Jan. 11, 1974 and bearing Ser. No. 432,499; now U.S. Pat. No. 3,909,589, granted Sept. 30, 1975.

BACKGROUND AND SUMMARY OF THE INVENTION

The present invention pertains to room ventilators and in particular, to room ventilators which in addition to performing a ventilating function also perform accessory functions such as lighting, heating, etc. More specifically the invention is directed to novel cooling systems for such ventilators which prevent undesired heat build-up in the ventilator.

In ventilating apparatus of the type to which the present invention relates a serious problem can arise when the accessory function is selected without the ventilating function being simultaneously selected. Without the flow of cooling air provided by operation of the ventilator heat from the accessory can build up to a point where temperature becomes excessive. Heretofore either a smaller auxiliary motor and fan has been provided to cool the unit in the event such excessive temperature is reached, or the unit must be made large enough to dissipate the heat through conduction and convection to the adjacent surroundings. Obviously, such prior ventilators are more bulky and more expensive.

The present invention is directed to a novel cooling means for preventing heat build-up in a ventilator apparatus of the aforementioned type. This is accomplished by means of a novel control arrangement as hereinafter disclosed in the preferred circuit embodiments of the invention. With the present invention, the blower motor itself is automatically controlled when the accessory function only is selected, and in this way heat build-up and hot spots within the ventilator are avoided. Thus with the present invention, a room ventilator may be more compactly packaged and has no need for a separate auxiliary cooling motor. Related aspects of the present invention involve the particular ways in which the selector switch functions are arranged to operate the ventilating and accessory function(s) of the ventilator in conjunction with automatic control of the blower motor and such will be seen in greater detail hereinafter.

Additional features and aspects of the invention will be seen in the ensuing description and claims which are to be taken in conjunction with the accompanying drawing.

The drawings illustrate preferred embodiments of the invention in accordance with the best mode presently contemplated for carrying out the invention.

DESCRIPTION OF THE PREFERRED EMBODIMENT

Figure 1:
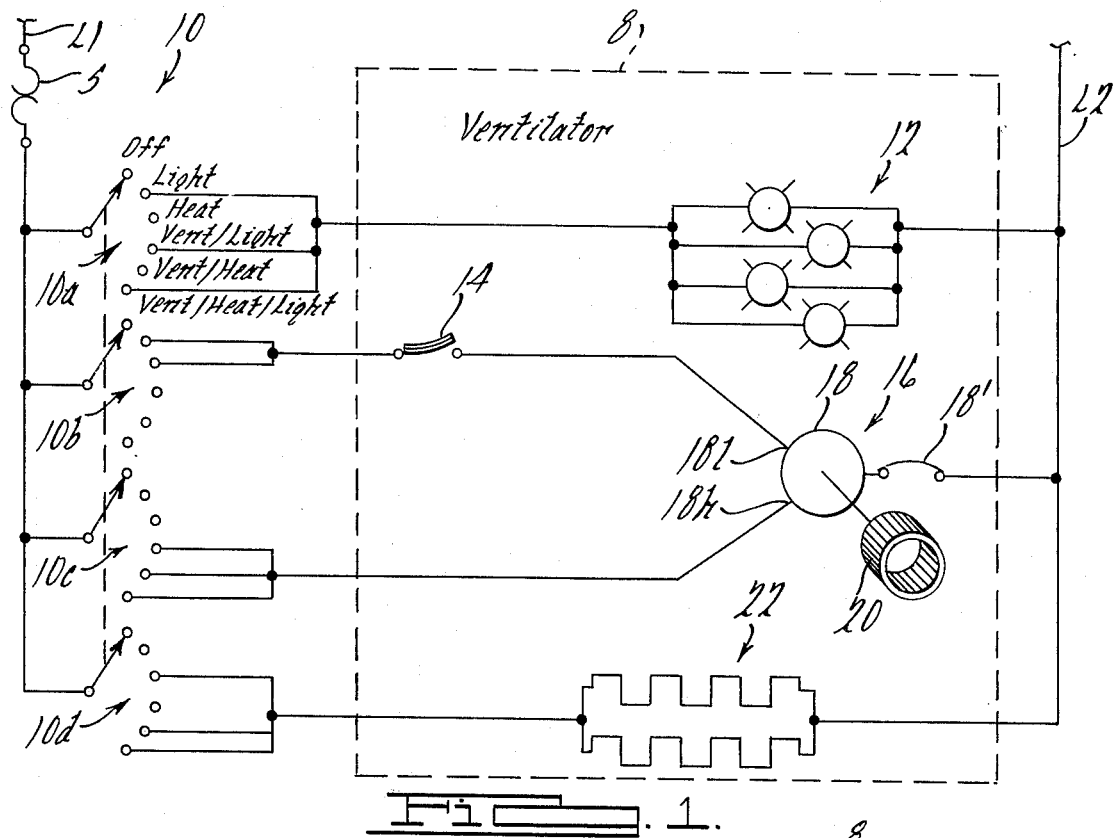
FIG. 1 is an electrical schematic diagram of one embodiment of the means for providing cooling of a room ventilator in accordance with the present invention.

The embodiment of the invention disclosed in FIG. 1 comprises: a selector switch 10; a bank of four incandescent lamps 12 all connected in parallel; a thermostatic switch 14; a blower 16 comprising a two speed electric motor 18 (with integral thermal overload protection 18′) and a squirrel cage blower 20 powered by motor 18; and a pair of parallel connected heater elements 22. All of these items, save selector switch 10, are mounted in a room ventilator 8 which is preferably of the ceiling-mounted type disclosed in the aforementioned cross referenced patent application. Switch 10 is preferably mounted in an adjacent side wall of the room. Although the invention can be practiced with either AC or DC power, the disclosed embodiment operates from an AC supply provided by lines L1 and L2 through a safety overload device S, and motor 18 is a shaded pole AC type provided with a high speed tap 18$h$ and a low speed tap 18$l$.

Switch 10 is a six position selector switch and is disclosed as a ganged set of four individual six-tap selector switch elements 10$a$, 10$b$, 10$c$ and 10$d$ to most clearly schematically illustrate its switching arrangement. It will be appreciated, however, that the particular construction details of switch 10 can be of any form which provides an equivalent switching arrangement and not necessarily the specific form schematically portrayed in FIG. 1. The wipers of the individual switch elements 10$a$, 10$b$, 10$c$ and 10$d$ connect through safety overload device S to line L1, and are ganged for operation in unison such that corresponding taps of each switch element are selected by each wiper in each of the six positions of the switch. For purposes of explanation, the six taps of each switch element are hereinafter referred to as the first, second, third, fourth, fifth and sixth taps respectively proceeding in the clockwise direction from the uppermost tap of each switch element as seen in the drawing. Accordingly, from the drawing it can be seen that the second, fourth and sixth taps of switch element 10$a$ connect to the bank of lamps 12; the second and third taps of switch element 10$b$ connect through thermostatic switch 14 to the low speed tap 18$l$ of motor 18; the fourth, fifth and sixth taps of switch element 10$c$ connect to the high speed tap 18$h$ of motor 18; and the third, fifth and sixth taps of switch element 10$d$ connect to the heating elements 22. The other sides of the lamps 12, blower 16 and heater elements 22 connect to line L2. With this arrangement, therefore, operation of the wipers to the first taps represents the OFF position of switch 10 wherein neither lamps 12 nor blower 16 nor heater elements 22 are energized; operation of the wipers to the second taps represents the LIGHT position of switch 10 wherein operation of only lamps 12 is selected; operation of the wipers to the third taps represents the HEAT position of switch 10 wherein operation of only heater elements 22 is selected; operation of the wipers to the fourth taps represents the VENTILATE/LIGHT position of switch 10 wherein operation only of blower 16 and of lamps 12 is selected; operation of the wipers to the fifth taps represents the VENTILATE/HEAT position of switch 10 wherein operation only of heater elements 22 and of blower 16 is selected; and operation of the wipers to the sixth taps represents the VENTILATE/HEAT/LIGHT position of switch 10 wherein operation of blower 16, of lamps 12 and of heater elements 22 is selected.

It will be observed that whenever switch 10 is in the VENTILATE/LIGHT position, the VENTILATE/HEAT position and the VENTILATE/HEAT/LIGHT position, blower 16 operates at high speed to ventilate the room. During ventilating of the room, air drawn through the ventilator provides cooling of the ventilator so that excessive temperatures do not occur therein. It will be noted, however, that when switch 10 is in the LIGHT position and the HEAT position, blower 16 is not necessarily operated. This particular feature of the invention provides thermostatic control of blower 16 when switch 10 is in these two positions whereby operation of blower 16 is thermostatically controlled by thermostatic switch 14 and in particular, blower 16 is caused to operate at low speed when thermostatic switch 14 closes. Thermostatic switch 14 is mounted in the ventilator to sense temperature, and when it senses temperature rise to a predetermined level, it closes thereby causing blower 16 to operate at low speed when the unit is in operation without the ventilating function being selected by switch 10. Thus in the event that the temperature reaches a level where switch 14 closes, blower 16 operates at low speed to provide relatively gentle ventilation sufficient to prevent excessive temperatures in the ventilator. It will be observed that this cooling effect is obtained without the use of a separate auxiliary motor. Also by providing such gentle ventilation, stronger ventilation, which is not desired by the person setting selector switch 10, is avoided; it being appreciated, however, that a single speed motor could be employed if desired. Furthermore, such gentle ventilation exhibits a relatively low noise level. Moreover, when the present invention is utilized in connection with ventilator structure as disclosed in the aforementioned cross referenced patent application, there is provided a maximum wattage capability in an extremely compact space, and this result has heretofore been unattainable in ventilators of this type.

Figure 2:
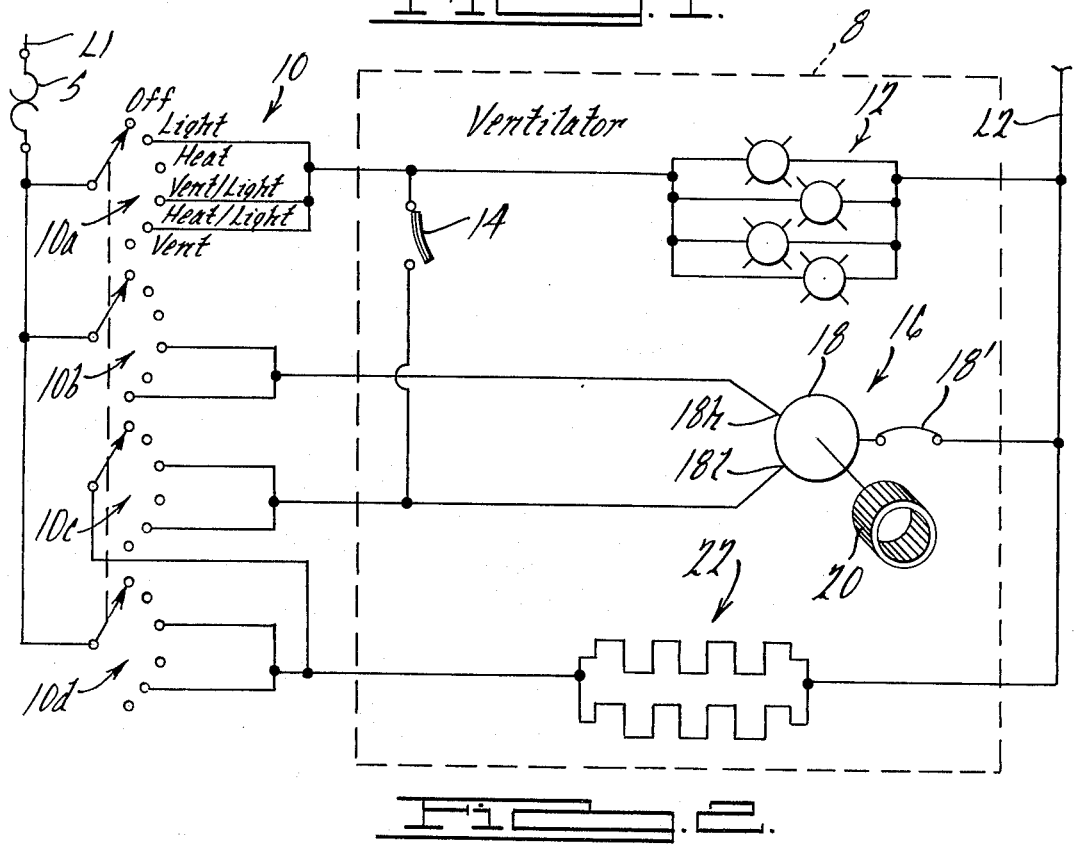
FIG. 2 is an electrical schematic diagram illustrating another embodiment.

The embodiment of the invention disclosed in FIG. 2 is similar to that of FIG. 1 in that ventilator 8 comprises the bank of lamps 12, the blower 16, the thermostatic switch 14 and the heater elements 22. However, important differences reside in the particular operating modes and more specifically, in the arrangement of switch 10 and the way in which the various elements are interconnected with each other. In the embodiment of FIG. 2 switch 10 is operative (by moving the wipers in the clockwise direction) from the OFF position to operative positions including a LIGHT position, a HEAT position, a VENTILATE/LIGHT position, a HEAT/LIGHT position and a VENTILATE position. Line L1 still connects through safety device S to the wipers of switch elements 10a, 10b, 10d, but the wiper of switch element 10c connects to the third and fifth taps of switch element 10d, which third and fifth taps also connect to heater elements 22. In this way switch element 10c is interlocked with switch element 10d so that the low speed tap 18l of motor 18 which connects to the third and fifth taps of switch element 10c is energized whenever heater elements 22 operate. Thus, blower 16 operates at least at low speed whenever heater elements 22 operate. Lamps 12 connect to the second, fourth and fifth taps of switch element 10a and the high speed tap 18h of motor 18 connects to the fourth and sixth taps of switch element 10b. It will be noted that thermostatic switch 14 connects from the second, fourth and fifth taps of switch element 10a to the low speed tap 18l of motor 18. With this arrangement, low speed operation of blower 16 is thermostatically controlled by thermostatic switch 14 only when the switch 10 is in the LIGHT position. Even though thermostatic switch 14 connects to the fourth and fifth taps of switch element 10a, it will be observed that when the fourth and fifth taps are selected the blower 16 is being energized; the high speed tap being energized from switch element 10b when the fourth taps are selected and the low speed tap 18l being energized from switch element 10c when the fifth taps are selected. This is in contrast to the embodiment of FIG. 1 wherein thermostatic switch 14 controls when in the LIGHT position and in the HEAT position. When switch 10 is in the HEAT position, blower 16 operates at low speed to provide gentle cooling of the ventilator structure regardless of whether thermostatic switch 14 is actuated or not. Under normal operation, the continuous operation of blower 16 concurrent with the energization of heater elements 22 precludes thermostatic switch 14 from being actuated. Since such actuation of thermostatic switch 14 is thus precluded whenever heater 22 is energized, it becomes impossible for the bank of lamps 12 to be energized through switch 10c and thermostatic switch 14 when switch 10 is in the HEAT position. Also, switch element 10c isolates heater elements 22 from thermostatic switch 14 when switch 10 is in the LIGHT position so as to preclude actuation of heater elements 22 when thermostatic switch 14 closes. Like the embodiment of FIG. 1, the embodiment of FIG. 2 operates blower 16 at high speed whenever switch 10 is at one of the operative positions which includes the ventilating function.

Figure 3:
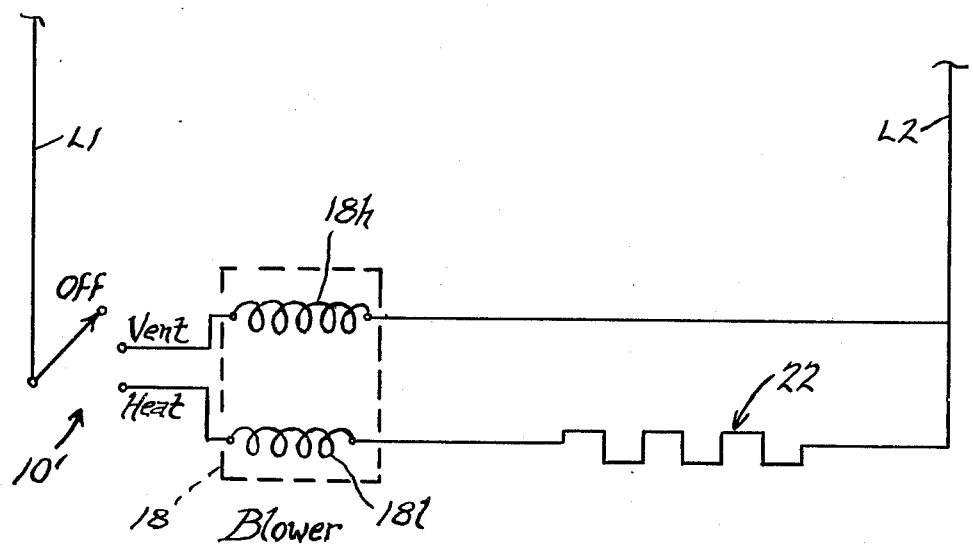
FIG. 3 is an electrical schematic diagram illustrating still another embodiment.

FIG. 3 depicts a further embodiment of the invention which possesses certain additional advantages and benefits. In particular, the embodiment, while providing cooling of the ventilator as explained earlier in connection with FIGS. 1 and 2, does not require the use of a thermostatic switch. Consequently, wiring is simplified, the number of components is reduced and the invention can be practiced with a maximum of economy. In FIG. 3 the selector switch 10' is a three-position selector switch operable to OFF, VENT and HEAT positions. The blower includes a two speed motor 18 having a low speed winding 18l and a high speed winding 18h. Heater 22 connects in series with low speed winding 18l and this series combination connects between lines L1 and L2 through the HEAT contact of switch 10'. High speed winding 18h connects between lines L1 and L2 through the VENT contact of switch 10'. Thus, when switch 10' is operated to the HEAT position the low speed winding 18l and heater 22 are both energized from lines L1 and L2. When switch 10' is operated to the VENT position the high speed winding 18h is alone energized from lines L1 and L2. Pursuant to the invention, the low speed winding 18l is constructed of sufficiently sized conductor to carry the current demanded by heater 22. The number of turns of winding 18l are selected to provide enough ampere turns and hence enough magnetic flux for blower motor 18 to cause the motor to operate at low speed. It will be appreciated that one skilled in the art can select the number of turns and wire size in accordance with known techniques. Thus, with this arrangement, whenever the heating function alone is selected, heater 22 operates and the blower simultaneously automatically operates at a relatively gentle speed to provide cooling for the ventilating unit. Although, the embodiment in FIG. 3 does not illustrate the use of a lighting function, it will be appreciated that in accordance with FIGS. 1 and 2, the arrangement could be constructed to provide lighting, selectable either singly or in various combinations with heating and ventilating. The embodiment of FIG. 3 differs from the embodiments of the earlier Figures in that thermostatic switch 14 is not required. This eliminates a separate component and simplifies wiring, thereby providing an economically advantageous arrangement. Furthermore, the FIG. 3 embodiment is advantageous in that it is impossible for both motor windings to be simultaneously energized from lines L1 and L2 and this permits the use of certain two-speed motors where the simultaneous energization of both high and low speed windings may not be preferred.

It is to be understood that the foregoing description is that of preferred embodiments of the invention. Various changes and modifications may be made without departing from the spirit and scope of the invention as defined by the appended claims.

I claim:

1. Means for preventing heat build-up in a wall-mounted room ventilator apparatus, said ventilator apparatus being of the type comprising an electrically powered blower means, an electrically powered heater means and an electrically powered lighting means and including a selector switch means selectively operable to each of a plurality of operative positions including a first operative position wherein operation of only said lighting means is selected, a second operative position wherein operation of only said heater means is selected, and at least one additional operative position wherein at least said blower means continuously operates, said means for preventing heat build-up comprising: a two speed electric blower motor means for powering said blower means having a first conductor which provides a high operating speed when energized and a second conductor which provides a low operating speed when energized; a normally open thermostatic switch means positioned in said ventilator apparatus to sense temperature, said thermostatic switch means being actuated to a closed position when it senses a temperature exceeding a predetermined level; first coupling means operatively coupling said thermostatic switch means with said second conductor of said electric blower motor means and with said selector switch means such that said second conductor of said electric blower motor means is energized when said thermostatic switch is actuated to a closed position to operate said blower means continuously at low speed when said selector switch means is in said first operative position, and second coupling means operatively coupling said selector switch means with said first conductor of said electric blower motor means such that said first conductor is energized to operate said blower means continuously at high speed when said selector switch means is in said at least one additional operative position.

2. Means for preventing heat build-up as claimed in claim 1 wherein third coupling means operatively couples said selector switch means with said second conductor of said electric blower motor means so that said second conductor is energized when said selector switch means is in said second operative position.

3. Means for preventing heat build-up as claimed in claim 2 wherein said third coupling means operatively couples said selector switch means with said second conductor of said electric blower motor means so that said second conductor is energized when said selector switch means is in said second operative position regardless if said thermostatic switch is actuated to an open or a closed position.

4. Means for preventing heat build-up as claimed in claim 1 wherein third coupling means operatively couples said selector means and said thermostatic switch with said second conductor of said electric blower motor means so that said second conductor is energized when said selector switch means is in said second operative position and said thermostatic switch is actuated to a closed position.

5. Means for preventing heat build-up in a wall-mounted room ventilator apparatus, said ventilator apparatus being of the type comprising an electrically powered blower means, an electrically powered heater means and an electrically powered lighting means and including a selector switch means selectively operable to each of a plurality of operative positions including one operative position wherein operation of only said lighting means is selected and another operative position wherein operation of only said heater means is selected and to at least a further operative position wherein at least said blower means continuously operates, said means for preventing heat build-up comprising: a two speed electric blower motor means for powering said blower means having a first conductor which provides a high operating speed when energized and a second conductor which provides a low operating speed when energized; a normally open thermostatic switch means positioned in said ventilator apparatus to sense temperature, said thermostatic switch means being actuated to a closed condition when it senses a temperature exceeding a predetermined level; first coupling means operatively coupling said thermostatic switch means with said second conductor of said electric blower motor means and with said selector switch means such that said second conductor of said electric blower motor means is energized when said thermostatic switch is actuated to a closed position to operate said blower means continuously at low speed when said selector switch means is in said one and said another operative positions; and second coupling means operatively coupling said selector switch means with said first conductor of said electric blower motor means such that said first conductor is energized to operate said blower means continuously at high speed when said selector switch means is in said at least a further operative position.

* * * * *